United States Patent
Peoples et al.

(10) Patent No.: US 10,118,831 B2
(45) Date of Patent: Nov. 6, 2018

(54) METHOD OF PRODUCING MAGNESIUM ALUMINATE SPINELS

(71) Applicant: Sasol (USA) Corporation, Houston, TX (US)

(72) Inventors: Brian C. Peoples, Westlake, LA (US); Allison L. Hann, Westlake, LA (US)

(73) Assignee: Sasol (USA) Corporation, Houston, TX (US)

( * ) Notice: Subject to any disclaimer, the term of this patent is extended or adjusted under 35 U.S.C. 154(b) by 0 days.

(21) Appl. No.: 15/545,920

(22) PCT Filed: Jan. 5, 2016

(86) PCT No.: PCT/US2016/012112
§ 371 (c)(1),
(2) Date: Jul. 24, 2017

(87) PCT Pub. No.: WO2016/122838
PCT Pub. Date: Aug. 4, 2016

(65) Prior Publication Data
US 2018/0009671 A1 Jan. 11, 2018

Related U.S. Application Data

(60) Provisional application No. 62/108,800, filed on Jan. 28, 2015.

(51) Int. Cl.
*C01F 7/00* (2006.01)
*C01F 7/16* (2006.01)

(52) U.S. Cl.
CPC .......... *C01F 7/162* (2013.01); *C01P 2002/32* (2013.01); *C01P 2006/12* (2013.01); *C01P 2006/14* (2013.01)

(58) Field of Classification Search
CPC ...................................................... C01F 7/162
USPC ................................................. 423/115, 600
See application file for complete search history.

(56) References Cited

U.S. PATENT DOCUMENTS

| 2,923,660 | A | * | 2/1960 | Hallmann | ................ | C01F 5/00 |
| | | | | | | 423/600 |
| 3,418,087 | A | * | 12/1968 | Schenck | ................ | C01F 7/002 |
| | | | | | | 423/518 |
| 3,567,472 | A | * | 3/1971 | Bratton | ................ | C01F 7/162 |
| | | | | | | 313/636 |
| 4,400,431 | A | | 8/1983 | Henslee et al. | | |
| 4,492,677 | A | | 1/1985 | Yoo et al. | | |
| 6,517,795 | B1 | | 2/2003 | Noweck et al. | | |

FOREIGN PATENT DOCUMENTS

| EP | 0110704 | 6/1984 |
| EP | 0990621 | 4/2000 |
| WO | WO 86/06090 | 10/1986 |
| WO | WO 99/41195 | 8/1999 |
| WO | WO 2000/44671 | 8/2000 |
| WO | WO 2013/155518 | 10/2013 |
| WO | WO 2014/135977 | 9/2014 |

OTHER PUBLICATIONS

Bratton, R.J., Coprecipitates Yielding MgAl2O4 Spinel Powders, American Ceramic Society, vol. 4, No. 8, Jan. 1, 1969, p. 759-762.

* cited by examiner

*Primary Examiner* — Steven J Bos
(74) *Attorney, Agent, or Firm* — Bushman Werner, P.C.

(57) ABSTRACT

The invention provides for a method of making a magnesium aluminate spinel including an alumina compound and a magnesium compound, the method including the steps of; dispersing the alumina compound by dispersing it in a aqueous solution, to form an alumina dispersion, the aqueous solution having a pH of between 2 and 5; preferably between 2 and 4, flocculating the alumina by increasing the pH of the alumina dispersion to a pH of between 8 and 10 by adding a base; adding the alumina dispersion to an aqueous dispersion of the magnesium compound to form a slurry; drying the slurry to produce a dried spinel precursor; and calcining the dried spinel precursor to produce the magnesium aluminate spinel. Dispersing at such a low pH results in a conversion to spinel as well as allows for the control of the surface area of the spinel.

15 Claims, 1 Drawing Sheet

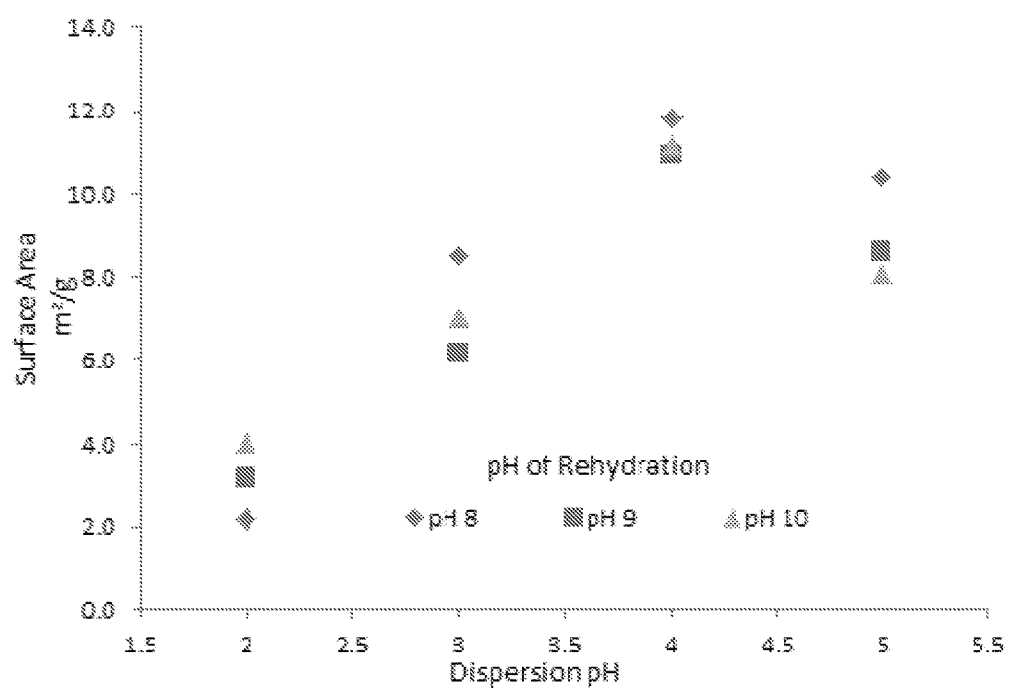

METHOD OF PRODUCING MAGNESIUM ALUMINATE SPINELS

CROSS-REFERENCE TO RELATED APPLICATIONS

This application is a national phase of PCT/US2016/012112 filed Jan. 5, 2016, which in turn claims priority to U.S. Application 62/108,800 filed Jan. 28, 2015, the disclosures of which are incorporated herein for all purposes.

FIELD OF INVENTION

The present invention relates to spinels, and more particularly, to the production of magnesium aluminate spinels.

BACKGROUND OF THE INVENTION

Spinels, in general are a class of minerals having the general formula $A^{2+}B_2^{3+}O_4^-$ Aluminum spinels include natural spinels, $MgAl_2O_4$, gahnite, $ZnAl_2O_4$, hercynite, and $FeAl_2O_4$. Although spinels are found in nature, due to increasing demand synthetic spinels are now being made by various methods.

Presently, spinels are used as windows and domes in high-speed missiles and pods. Although silicate glasses are suitable for most common window uses, they are too weak to be used in the latter applications. A magnesium aluminate spinel is a polycrystalline ceramic material that has excellent optical and mechanical properties.

The synthesis of magnesium aluminate spinels is well-known in the literature. The common methods of synthesis can be divided into three basic classes: co-precipitation of aluminum and magnesium salts; ball milling of magnesium and aluminum compounds; and wet mixing of alumina and magnesium compounds. Each of these processes has inherent limitations which may limit their utility on an industrial or commercial scale.

Generally, the methods for producing magnesium aluminate spinels involve contacting an alumina compound with a magnesium compound under specific process conditions to obtain a slurry or solution that is then dried and calcined to form the spinel.

Such methods are described in a number of patents. U.S. Pat. No. 4,400,431 describes a method for preparing polymetallic spinels by co-precipitation of the metals in an alkali solution having a pH in the range of 8 to 10. EP 0110704 describes a process of adding an alumina component to a liquid phase having a pH of 8.5 to 10.5, preferably 9 to 10. WO 86/06090 describes a method of preparing spinel compositions by combining an acidic solution containing at least one alkaline earth metal component with a basic solution containing at least one alumina component to form a combined mass including a liquid phase and an alkaline earth metal, Al-containing precipitate. This application specifically requires that the pH of the liquid phase during the combination be maintained at a pH of 7 to 9.5, preferably 7 to 8.5.

U.S. Pat. No. 6,517,795 describes a process for producing hydrotalcites, and metal oxides thereof, by calcination. The hydrotalcites are obtained by hydrolyzing mixtures of metal alcoholates. As per this patent the pH value of the water for hydrolysis may be in the range of 0 to 14, preferably 1 to 13. A preferred pH range is not taught.

Akzo Nobel NV has also patented processes in this area of technology for example in patent applications WO 99/41195, and WO 2000/44671. In these applications, it is described that an aluminium source and a magnesium source are fed into a reactor and reacted in an aqueous suspension to obtain an anionic clay. The invention describes that the pH of this reaction is to be controlled e.g. by the use of a pH modifier ammonium base. The modifier may be added to the slurry before or during the reaction or to the individual reactants before their combination in a slurry. The preferred pH ranges are not described in the applications however, examples in the respective patents use a pH between 6 and 10.

WO 2013/155518 describes a process for the production of magnesium aluminate spinels in which boehmite alumina is hydrothermally aged in the presence of a magnesium compound, or in which the boehmite alumina is aged hydrothermally (apart) and then contacted with a magnesium compound. Either material can be dried and calcined to produce a spinel. Again, no preferred pH range is mentioned.

As seen from the above, the prior art teaches that a basic pH is required when adding the alumina to an aqueous solution.

The inventors of the present invention have found that the prior art methods produce magnesium aluminate spinels with significantly varying properties e.g. the surface area, etc. of the magnesium aluminate spinels. The need has been identified to control these properties, especially the surface area, to produce spinels of improved quality which can be used in a variety of applications.

SUMMARY OF THE INVENTION

The inventors of the present invention have identified that control of pH at the alumina dispersion stage of a process to manufacture magnesium aluminate spinels allows one to control properties of the magnesium aluminate spinel e.g. surface area and pore volume as well as improves the conversion rates to the spinel. This is surprising as the alumina structure should not be affected by a low pH and it was expected that the spinel produced across a pH range should have identical properties.

According to the invention there is provided a method of making a magnesium aluminate spinel including an alumina compound and a magnesium compound, the method including the steps of:
  a) dispersing the alumina compound in an aqueous solution to form an alumina dispersion; the aqueous solution having a pH of between 2 and 5;
  b) flocculating the alumina by adding a base to increase the pH of the alumina dispersion to a pH of between 8 and 10;
  c) adding the alumina dispersion to an aqueous dispersion of the magnesium compound to form a slurry;
  d) drying the slurry to produce a dried spinel precursor; and
  e) calcining the dried spinel precursor to produce the magnesium aluminate spinel.

In a preferred embodiment the alumina is dispersed in an aqueous solution having a pH of between 2 and 4.

The alumina compound includes aluminum oxyhydroxide, aluminum oxide, aluminum hydroxide, or mixtures thereof. The alumina compound is preferably selected from Boehmite, Bayerite, Gibbsite, gamma-alumina, transitional (delta-theta) aluminas and mixtures thereof. More preferably, the alumina compound is selected from boehmite and gamma-aluminas and is most preferably ultra high purity boehmite.

The pH of the aqueous solution may be modified by the addition of an acid. The acid may include formic acid, acetic acid, citric acid, nitric acid, hydrochloric acid, oxalic acid, butanoic acid, sulfuric acid and others.

The acid may be added in an amount of 0.001 wt % to 10 wt % to the aqueous solution and may be added before the dispersal of the alumina compound or after the dispersal of the alumina compound. The acid is preferably added before dispersing the alumina compound in the aqueous solution.

The magnesium compound may include magnesium oxides and salts. These magnesium oxides and salts may include magnesium hydroxide, magnesium hydrate, magnesium oxide, magnesium acetate, magnesium nitrate, magnesium chloride, magnesium formate, and magnesium acetate.

The magnesium compound is more preferably magnesium oxide or magnesium hydroxide and most preferably magnesium hydroxide.

BRIEF DESCRIPTION OF THE DRAWINGS

The invention will now be described with reference to the following Figures, in which:

FIG. 1 represents a graph of a Surface Area of Spinel Materials Produced as a Function of Dispersion pH as per the Examples.

DETAILED DESCRIPTION OF THE PREFERRED EMBODIMENTS

The invention is related to a method of making a magnesium aluminate spinel which includes an alumina compound and a magnesium compound.

A first step to the method includes the dispersal of the alumina compound before it is contacted with the magnesium compound, which includes dispersing the alumina compound in an aqueous solution to form an alumina dispersion. The inventors have found that there is a correlation between the pH at which the alumina compound is dispersed in the aqueous solution and properties of the magnesium aluminate spinel, especially the surface area. Conversion to spinel is also increased. The pH of the aqueous solution should be between 2 and 5, preferably 2 and 4.

The alumina compound in the form of an Ultra High Purity Alumina (UHPA), for example, is added to an aqueous solution including water to form an alumina dispersion. The alumina compound can be milled prior to use to improve dispersibility.

An acidic solution including formic acid, acetic acid, citric acid, nitric acid, hydrochloric acid, oxalic acid, butanoic acid, or sulfuric acid is added to the aqueous solution in amount of 0.001-10 wt % to the aqueous solution. It is preferable to add the acidic solution as a dilute solution rather than at high concentrations. It is further preferable to add the acidic solution to the aqueous solution before dispersing the alumina.

A base is then added to the alumina dispersion to increase its pH. The base preferably includes ammonium hydroxide. The ammonium hydroxide is added to the alumina dispersion after about 30 minutes to increase the pH of the alumina dispersion to a pH of 8 to 10. The base is added in amounts of 0.001 to 0.5 wt % of the alumina dispersion. It is preferable if the base is added as a dilute solution rather than at high concentrations.

The alumina dispersion is then added to a magnesium compound, for example an aqueous suspension of $Mg(OH)_2$, to form a slurry.

If the slurry is too viscous to permit pumping, it can be thinned using Deionized (hereinafter "DI") water.

As is well known by those skilled in the art, typical processes of producing spinels involve a drying step. The drying can be by means of direct or indirect heating methods. These methods may include spray dryer, contact dryer, or pan dryer. A preferred method is spray drying. Drying takes place at various temperatures depending on the drying technique used. Larger dryers are operated at inlet temperatures of between 350° C. to 400° C. and outlet temperatures of 100-105° C., whilst smaller dryers are operated at inlet temperatures of about 275° C. and outlet temperatures of 100-105° C.

The spinel precursor can be calcined to spinel by heating in a furnace at 1200° C. for 4 hours or 1375° C. for 2 hrs. Typically the spinel is calcined over 8 hours to a max temperature of 1200° C.

The invention will now be exemplified according to the following non-limiting example(s).

EXPERIMENTAL

Example 1

278 g of milled UHPA (Ultra High Purity Alumina) was dispersed into 2700 g of DI water and the pH adjusted to 5 using formic acid. The dispersion was stirred for about 30 minutes at which time it was split into three equal rehydrated alumina samples. The pH of the samples was adjusted to 8, 9 and 10. At this point the rehydrated alumina samples were added to three separate dispersions of 41 g $Mg(OH)_2$ in 360 g DI water.

Example 2

278 g of milled UHPA was dispersed into 2700 g DI water and the pH adjusted to 4 using formic acid. The dispersion was stirred for about 30 minutes at which time it was split into three equal rehydrated alumina samples. The pH of the samples was adjusted to 8, 9 and 10. At this point the rehydrated alumina samples were added to three separate dispersions of 41 g $Mg(OH)_2$ in 360 g DI water.

Example 3

278 g of milled UHPA was dispersed into 2700 g DI water and the pH adjusted to 3 using formic acid. The dispersion was stirred for about 30 minutes at which time it was split into three equal rehydrated alumina samples. The pH of the samples was adjusted to 8, 9 and 10. At this point the rehydrated alumina samples were added to three separate dispersions of 41 g $Mg(OH)_2$ in 360 g DI water.

Example 4

278 g of milled UHPA was dispersed into 2700 g DI water and the pH adjusted to 2 using formic acid. The dispersion was stirred for about 30 minutes at which time it was split into three equal rehydrated alumina samples. The pH of the samples was adjusted to 8, 9 and 10. At this point the rehydrated alumina samples were added to three separate dispersions of 41 g $Mg(OH)_2$ in 360 g DI water.

Comparative Example 1

278 g of milled UHPA was dispersed into 2700 g DI water and the pH adjusted to 6 using formic acid. The dispersion was stirred for about 30 minutes at which time it was split into three equal rehydrated alumina samples. The pH of the samples was adjusted to 8, 9 and 10. At this point the rehydrated alumina samples were added to three separate dispersions of 41 g Mg(OH)$_2$ in 360 g DI water.

The materials from Examples 1 to 4 were spray dried and calcined at 1200° C. for 4 hours. X-ray diffraction (XRD) analysis of the materials indicated a high conversion to spinels as shown by the lack of residual MgO and Al$_2$O$_3$ peaks in the spectra. The surface area results are shown in Table 1 below and in FIG. 1.

The material of Comparative Example 1 was spray dried and calcined at 1200° C. for 4 hours. XRD analysis of the material indicated that the conversion to spinel was incomplete as shown by presence of residual MgO and Al$_2$O$_3$ peaks in the spectra.

Table 1 Surface Area and pore volume of spinel materials prepared using different rehydration conditions.

TABLE 1

| Dispersion Conditions | Rehydration conditions | Surface Area (m$^2$/g) | Pore Volume (cm$^3$/g) | Spinel Conversion by XRD (%) |
|---|---|---|---|---|
| pH 2 | pH 8 | 2.2 | 0.03 | 100 |
| pH 2 | pH 9 | 3.2 | 0.04 | 96 |
| pH 2 | pH 10 | 4.1 | 0.09 | 96 |
| pH 3 | pH 8 | 8.5 | 0.09 | 98 |
| pH 3 | pH 9 | 6.2 | 0.08 | 97 |
| pH 3 | pH 10 | 7.0 | 0.09 | 100 |
| pH 4 | pH 8 | 11.8 | 0.27 | 99 |
| pH 4 | pH 9 | 10.9 | 0.12 | 94 |
| pH 4 | pH 10 | 11.2 | 0.13 | 100 |
| pH 5 | pH 8 | 10.4 | 0.13 | 89 |
| pH 5 | pH 9 | 8.6 | 0.11 | 99 |
| pH 5 | pH 10 | 8.1 | 0.11 | 85 |
| pH 6[1] | pH 8 | 6.4 | 0.048 | 84 |
| pH 6[1] | pH 9 | 6.2. | 0.048 | 75 |
| pH 6[1] | pH 10 | n.m. | n.m. | |

[1]The materials produced by dispersing the alumina at a pH of 6 did not convert well to spinel and surface area values and pore volume values could not be accurately taken.

The surface area of the materials, shown in Table 1 and in FIG. 1, shows a preferred dispersion pH of 4. As the pH is increased from 4, control of the surface area of the spinel begins to decrease, and this coupled with the incomplete conversion to spinel cause the material to be less useful.

From the results it is clear that the surface area of the magnesium aluminate spinels is dependent on the pH at which the alumina compound is dispersed. Lower pH dispersions produce lower surface area spinels i.e. increasing the pH of the dispersion results in spinel materials with higher surface areas.

This is shown as the surface area of the final magnesium aluminate spinel can be varied from 2 m$^2$/g to 10 m$^2$/g by altering the pH whilst maintaining other process parameters.

At a pH of 5, the advantage of controlling the surface area begins to fail as the conversion to spinel begins to decrease, and at a dispersion pH of 6 the materials have substantial concentrations of aluminum and magnesium oxides as conversion to spinel is low.

The pore volumes increases with increasing pH as well, reaching its highest at a pH of 4, and then decreasing as a pH 5 is reached.

Although specific embodiments of the invention have been described herein in detail, this has been done solely for the purposes of explaining the various aspects of the invention, and is not intended to limit the scope of the invention as defined. Those skilled in the art will understand that the embodiments shown and described are exemplary and various other substitutions, alterations and modifications, including but not limited to those design alternatives specifically discussed herein, may be made in practice of the invention without departing from its scope.

The invention claimed is:

1. A method of making a magnesium aluminate spinel including an alumina compound and a magnesium compound, the method including the steps of:
   a) dispersing the alumina compound in an aqueous solution, to form an alumina dispersion, the aqueous solution having a pH of between 2and 5;
   b) flocculating the alumina by adding a base to increase the pH of the alumina dispersion to a pH of between 8 and 10;
   c) adding the alumina dispersion having a pH of between 8 and 10to an aqueous dispersion of the magnesium compound to form a slurry;
   d) drying the slurry to produce a dried spinel precursor; and
   e) calcining the dried spinel precursor to produce the magnesium aluminate spinel.

2. The method of claim 1 wherein the alumina is dispersed in step a) at a pH of between 2 and 4.

3. The method of claim 1, wherein the alumina compound includes aluminum oxyhydroxide, aluminum oxide, aluminum hydroxide or mixtures thereof.

4. The method of claim 1, wherein the alumina compound is selected from the group consisting of boehmite, bayerite, gibbsite gamma-alumina, transitional aluminas and mixtures thereof.

5. The method of claim 4, wherein the alumina compound is selected from the group consisting of boehmite and gamma-aluminas.

6. The method of claim 5, wherein the alumina compound is ultra high purity boehmite.

7. The method of claim 1, wherein, the pH of the aqueous solution in step a) is modified by addition of an acid.

8. The method of claim 7, wherein the acid includes formic acid, acetic acid, citric acid, nitric acid, hydrochloric acid, oxalic acid, butanoic acid, and sulfuric acid.

9. The method of claim 7, wherein the acid is added in an amount of 0.001 wt % to 10 wt % to the aqueous solution.

10. The method of claim 7, wherein the acid is added before the dispersal of the alumina compound or after the dispersal of the alumina compound.

11. The method of claim 10, wherein the acid is added before dispersing the alumina compound in the aqueous solution.

12. The method of claim 1, wherein the magnesium compound includes magnesium oxides and salts.

13. The method of claim 12, wherein the magnesium oxides and salts include magnesium hydroxide, magnesium hydrate, magnesium oxide, magnesium acetate, magnesium nitrate, magnesium chloride, and magnesium formate.

14. The method of claim 13, wherein the magnesium compound is magnesium oxide or magnesium hydroxide.

15. The method of claim 14, wherein the magnesium compound is magnesium hydroxide.

* * * * *